United States Patent Office 3,185,856
Patented May 25, 1965

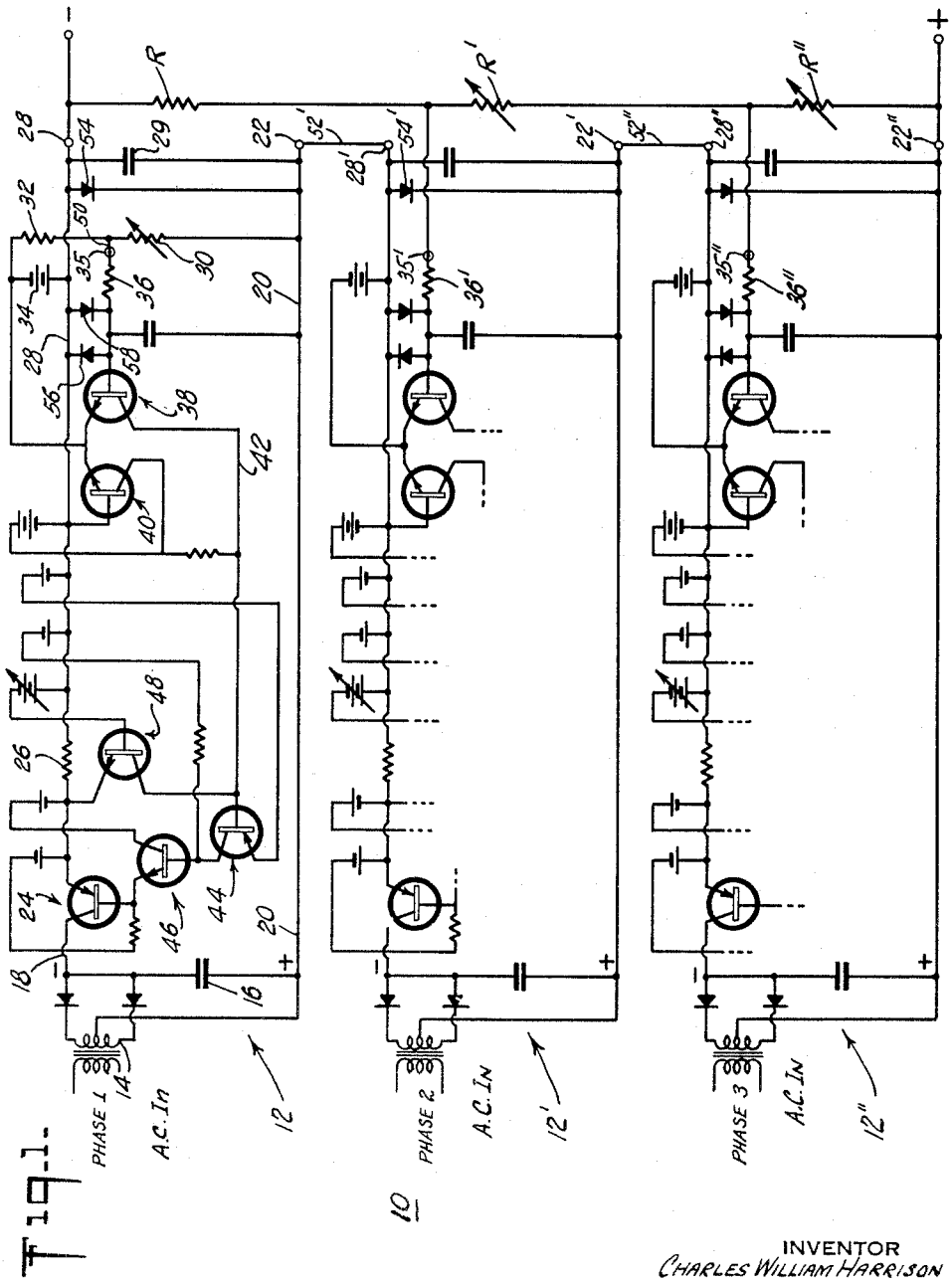

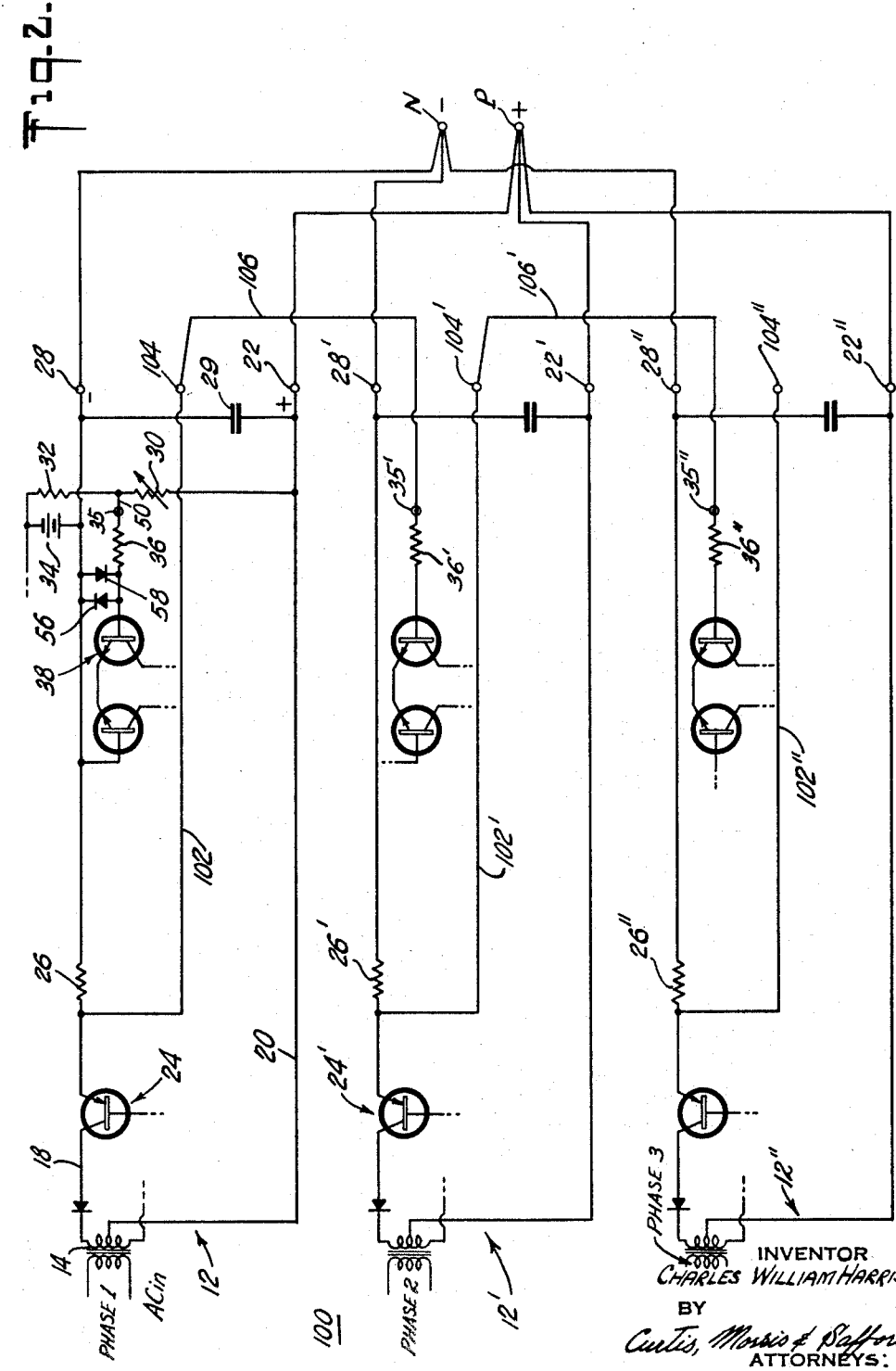

3,185,856
INTERCONNECTION OF POWER SUPPLY UNITS
Charles William Harrison, Millington, N.J., assignor to Hewlett-Packard Company, Palo Alto, Calif., a corporation of California
Filed Feb. 28, 1961, Ser. No. 92,392
6 Claims. (Cl. 307—55)

This invention relates to arrangements for connecting two or more regulated voltage supplies in series or in parallel.

In recent years there have been developed all-transistor voltage supply units which very effectively regulate a direct output voltage within closely determined limits. One of the best units of this kind is disclosed and claimed in the inventor's U.S. Patent No. 2,942,174. Such a unit typically has a maximum load current capacity of several amperes and an output voltage settable at any value within a range from about zero to 50 volts, for example. Now, it often happens that there is a need for higher voltage or current than is available from a single supply unit of this kind. But even though several units are available and could be connected together in series or in parallel, it is not a simple matter to do this in view of the fact that each unit has an adjustable output voltage. If the voltage of one unit is set too high and of another too low, one unit will have to supply too much power, and another, not enough. Moreover, unwanted circulating currents may occur. It is desirable that this unbalanced condition should be avoided.

For the sake of operating convenience it is moreover desirable that the total output voltage and current of two or more of these power units, whether connected together in series or in parallel, be adjustable from a single control knob. This means that the power supplied by each individual unit, as the total output voltage and current are changed, should change in proportion to the total output power. This will assure that each unit carries a fair share of the load. The present invention provides a simple and highly effective answer to this problem of connecting power supplies together.

In accordance with the present invention, in one specific embodiment thereof, three identical regulated voltage supplies, each having an adjustable output voltage, are connected with their outputs in series so that the total output voltage is controlled through the voltage adjusting knob of one unit, the output voltage of the other two units automatically tracking that of the first. To this end each of these power units is provided with a readily accessible panel on which are mounted certain terminal points of the internal circuit of the unit, these terminals being connected in desired fashion by removable jumpers. By rearranging these terminal connections and by connecting certain terminals of one unit to other terminals of the next unit and so on, any one unit can be made the master control one while the others function in unison with it as slaves. If desired the A.C. inputs, respectively, of the three units can be connected separately to individual phases of a three-phase power line, though of course all three inputs can instead be connected in parallel to a single-phase power line.

In another embodiment of the invention the same three units are connected with their outputs in parallel, the output voltage of the combination being controlled from one unit, the voltage of all three units being kept equal at any setting so that there are no internal circulating currents. As will appear, a power supply unit can, with only little additional expense, be fitted at the factory with accessible connections so that a user having two or more like units at hand can easily and safely connect them in series or in parallel to obtain a single control adjustable voltage power supply of greater voltage or current.

A better understanding of the invention together with a fuller appreciation of its many advantages will best be gained from the following description given in connection with the accompanying drawings wherein:

FIGURE 1 is a schematic circuit diagram of three regulated voltage supply units connected in series in accordance with the invention, and FIGURE 2 is a circuit diagram of the same units connected in parallel in accordance with the invention.

The series circuit 10 shown in FIGURE 1 comprises three identical power units, generally indicated at 12, 12' and 12''. The layout and operation of each unit is generally the same as for the unit described in the above-identified patent. Briefly, and with specific reference to the top unit 12 which is shown completely, each unit has an A.C. input transformer 14, to the output of which is connected a full-wave rectifier arrangement and a large filter capacitor 16. This produces an unregulated direct voltage across the capacitor at input leads 18 and 20. The former lead is held at a negative potential while lead 20, which is also connected directly to an output terminal 22, is positive.

Lead 18 is connected through a main regulating transistor 24 and a low-resistance current-sensing resistor 26 to an output lead and negative terminal 28. This lead is by-passed to lead 20 by a large filter capacitor 29. To maintain the voltage on lead 28 constant at a chosen value, the voltage between negative lead 28 and positive lead 20 is sensed, and any deviations are amplified and applied to the base of main regulating transistor 24 in proper phase to return the output voltage to the chosen value.

Connected to lead 20 is a variable resistor 30, the other end of this resistor being connected through a high value resistor 32 and a battery 34 to lead 28. This latter resistor and battery serve as a constant-current source to develop across resistor 30 a bias voltage which is dependent upon the resistance value of resistor 30. The setting of variable resistor 30, whose setting is adjustable by a knob on the front panel of the unit, determines the output voltage maintained across leads 20 and 28. The advantages and operation of this arrangement are explained in detail in the aforesaid patent.

The upper end of variable resistor 30 is connected at a junction 35 through a small isolating resistor 36 to the base of one transistor 38 of a differential amplifier, the base of the other transistor 40 of this amplifier being connected to lead 28. The output of this differential amplifier is applied through a lead 42 to an intermediate amplifying transistor 44. This in turn controls a driver transistor 46 which is connected to main regulating transistor 24. When the voltage across leads 20 and 28 decreases (because of increased load, for example), the voltage change is sensed by the differential amplifier and applied to main regulating transistor 24 in proper phase to decrease the voltage drop across it and thereby compensate for the drop in output voltage. Conversely, when the output voltage tries to rise above the set valve, the voltage drop across main regulating transistor 24 is increased to compensate for the change.

The load current flowing through output lead 28 develops a small voltage drop across current-sensing resistor 26. When this drop increases to a certain value, indicating that the load current has reached a safe limit, a transistor 48 turns on and assumes control of the base electrode of intermediate transistor 44. This limits the maximum output current to a value determined by the size of resistor 26 and the bias setting of transistor 48.

To facilitate the interconnection of unit 12 with the others like it, its terminal 35 is mounted on a panel conveniently located on the unit, this terminal being connected by a removable jumper 50 to the juncture of variable resistor 30 and resistor 32. This jumper is left in place for unit 12, which in the series circuit 10 serves as the master control unit. However, for units 12' and 12", the jumpers are removed and terminal 35' is connected to the juncture of two external resistors R and R', these being in series with a third external resistor R" between the top positive terminal 28 and the bottom negative terminal 22". Terminal 35" of unit 12" is connected between resistors R' and R", and the series connection between the three units is completed by placing jumpers 52' and 52", respectively, between terminals 22 and 28', and terminals 22' and 28".

Assuming that resistor R' and R" are each made equal to resistor R, then the total voltage between terminals 28 and 22" will be divided equally across these three resistors. Therefore, if variable resistor 30 of unit 12 is set so that the output voltage of this unit (i.e. the voltage between terminals 28 and 22) is regulated at a value V then the output voltage of units 12' and 12" will each be V, and the total voltage from terminal 28 to terminal 22", 3V. Changing the voltage V of unit 12 causes an equal change in the voltages of units 12' and 12". If desired, R' and R" can be made greater or less than R so that the voltages of units 12' and 12" will be greater or less than for unit 12. However, the output voltages of the slave units 12' and 12" will change proportionally with changes in the voltage of master unit 12. Though the output voltage of circuit 10 is the sum of the voltages produced by the three units 12, 12' and 12", the total output ripple voltage of a circuit 10 which has been built and successfully operated, is approximately only as great as the ripple voltage from one unit 12 by itself.

As a safety precaution the output terminals 28 and 22 of unit 12 are bypassed by a diode 54. This diode is connected in reverse direction and normally does not conduct. However, should terminal 28 try to go positive relative to terminal 22, diode 54 will conduct and prevent damage to capacitor 29, and other elements of the unit. To prevent excess excursions in voltage, in either direction, at the base of transistor 38, the base is bypassed to lead 28 by a diode 56 and by a diode 58. One diode is poled for current flow downward, and the other for flow upward, and each is a silicon type requiring about 0.5 volt across it before it conducts. However, the base of transistor 38 is normally at a potential of about 0.2 volt relative to lead 28 and, therefore, neither diode 56 or 58 will conduct under usual conditions.

The three power units can just as easily be connected in parallel as shown by a circuit 100 in FIGURE 2. Here the respective terminals 28 and 22 of the three units are connected, respectively, to a pair of output terminals N and P. Inside unit 12 there is connected to the left end of current-sensing resistor 26 a lead 102 whose other end is connected to a terminal 104 mounted on the same panel as terminal 35. In the case of the top unit 12, jumper 50 is left in place while for unit 12', jumper 50' is removed and terminal 35' is connected by a jumper 106 to terminal 104 of unit 12. Similarly, for bottom unit 12", jumper 50" is removed and terminal 35" is tied by a jumper 106' to terminal 104' of unit 12'. The emitters of the transistors which form the differential input amplifiers in each unit are connected through a bias supply 34 to the output terminal 28 in each unit, as shown in the complete unit of FIGURE 1. Since the terminals 28 of the units which are connected to output terminal N are at the same potential in the parallel connection, then the input base electrode of the transistor differential amplifier in the second and subsequent units is elevated with respect to the potential on terminal N by the potential drop across resistors 26' and 26", respectively. With these connections made, unit 12 serves as the master control unit, the potential drop across its resistor 26 (which drop is proportional to load current) determining the output voltage of unit 12', and the drop across resistor 26' determining the output voltage of unit 12". When a load is applied across terminals N and P, the total current will divide equally among the three units. Because the output voltage of unit 12' is controlled by unit 12, and so on, circulating currents from one unit to another are avoided.

It will now be seen that by providing the accessible terminals 35 and 104, and removable jumper 50, a variable voltage unit 12 can easily be connected in series or in parallel with a like unit or units. This permits great flexibility in the use of two or more power supplies to obtain greater voltage or current, or both.

The above description is intended in illustration and not in limitation of the invention. Various changes or modifications in the embodiments set forth may occur to those skilled in the art and these can be made without departing from the spirit or scope of the invention as set forth.

I claim:

1. A power supply circuit comprising a pair of output terminals, a first power supply unit having an input adapted to be energized with unregulated direct voltage and having a pair of output terminals, a main regulating voltage dropping element for the first power supply unit connected in series relation between said input and output of the first power supply unit, a resistor connected to the output of said first power supply unit, an amplifier for the first power supply unit having an input and having an output connected to control the conductivity of said element in the first power supply unit, said amplifier having its input connected to said resistor to receive a signal related to the output of said first power supply unit for controlling said regulating element in proper phase relationship to maintain the output voltage of the first unit constant, and a second unit substantially like the first, means connecting the outputs of said units in only one of series and parallel circuit to the output terminals of said power supply circuit, means including a sensing resistor connected between one of said output terminals of the power supply circuit and a point in said power supply circuit of different potential than the potential on said one output terminal when one of said units is delivering power to said output terminals for providing a voltage drop across the sensing resistor which is proportional to the power delivered by said first power supply unit, and means connecting the input of the amplifier of said second unit to the sensing resistor, whereby said units deliver proportional amounts of the total power supplied at the output terminals of said power supply circuit.

2. The circuit in claim 1 wherein the outputs of said units are connected in parallel, and said sensing resistor is serially connected between the voltage dropping element in said first unit and an output terminal of said circuit.

3. The circuit in claim 1 wherein each unit is energized by a transformer-rectifier arrangement, each transformer being energized from a separate phase of a multi-phase A.C. line.

4. A power supply circuit having output terminals, the circuit comprising a plurality of power supply units, each unit having an output and having an input adapted to receive an unregulated voltage and including a regulating element serially connected between the input and the output and including an amplifier having an input and having an output connected to said element for controlling the conductivity of said element in response to signals at the input of said amplifier, at least a first one of said units having means including a resistor connected to the output of the first one of said units, the input of the amplifier of said first one of the units being connected to said resistor to receive a signal related to the output voltage of said first one of the units, conductive connections serially connecting the outputs of said units between said output terminals, a sensing resistor for each of said units, means serially connecting the sensing resistors between the output terminals of said circuit to produce voltage drops proportional to the power delivered by each of said units, and means connecting the inputs of the amplifiers in successive ones of said units after the first one of said units to selected ones of the common terminals of the serially connected sensing resistors, whereby each of said units delivers proportional amounts of the total power delivered by said circuit.

5. A power supply circuit having output terminals, the circuit comprising a plurality of power supply units, each unit having an output and having an input adapted to receive an unregulated voltage and including a regulating element serially connected between the input and the output and including an amplifier having an input and having an output connected to said element for controlling the conductivity of said element in response to signals at the input of said amplifier, at least a first one of said units having means including a resistor connected to the output of the first one of said units, the input of the amplifier of said first one of the units being connected to said resistor to receive a signal related to the output voltage of said first one of the units, conductive connections connecting the outputs of said units in parallel to said output terminals, a sensing resistor for each of said units, means serially connecting the sensing resistor for each unit between the regulating element for the same unit and an output terminal of said circuit to produce voltage drops proportional to the power delivered by each of said units, and means connecting the inputs of the amplifiers in successive ones of said units after the first one of said units to the sensing resistor in a preceding one of said units, whereby each of said units delivers proportional amounts of the total power delivered by said circuit.

6. A power supply circuit comprising a first power supply unit having an input adapted to be energized with unregulated direct voltage and having a pair of output terminals, a main regulating voltage dropping element for the first power supply unit connected in series relation between said input and output of the first power supply unit, a resistor connected to the output of said first power supply unit, an amplifier for the first power supply unit having an input and having an output connected to control the conductivity of said element in the first power supply unit, said amplifier having its input connected to said resistor to receive a signal related to the output of said first power supply unit for controlling said regulating element in proper phase relationship to maintain the output voltage of the first unit constant, and a second unit substantially like the first, means connecting the outputs of said units in series between the output terminals of said power supply circuit, a sensing resistor, a voltage divider including said sensing resistor connected between said output terminals for providing a voltage drop across the sensing resistor which is proportional to the power delivered by said first power supply unit, and means connecting the input of the amplifier of said second unit to the sensing resistor, whereby said units deliver proportional amounts of the total power supplied at the output terminals of said power supply circuit.

References Cited by the Examiner
UNITED STATES PATENTS

| | | | |
|---|---|---|---|
| 2,806,963 | 9/57 | Wall | 307—77 |
| 2,994,029 | 7/61 | Bixby | 323—22 |
| 3,005,147 | 10/61 | Thomas | 323—22 |

OTHER REFERENCES

Electronics—Designing Transistorized, Sept. 23, 1960, pages 62–65.

LLOYD McCOLLUM, *Primary Examiner.*
MILTON O. HIRSHFIELD, *Examiner.*